United States Patent Office 3,460,225
Patented Aug. 12, 1969

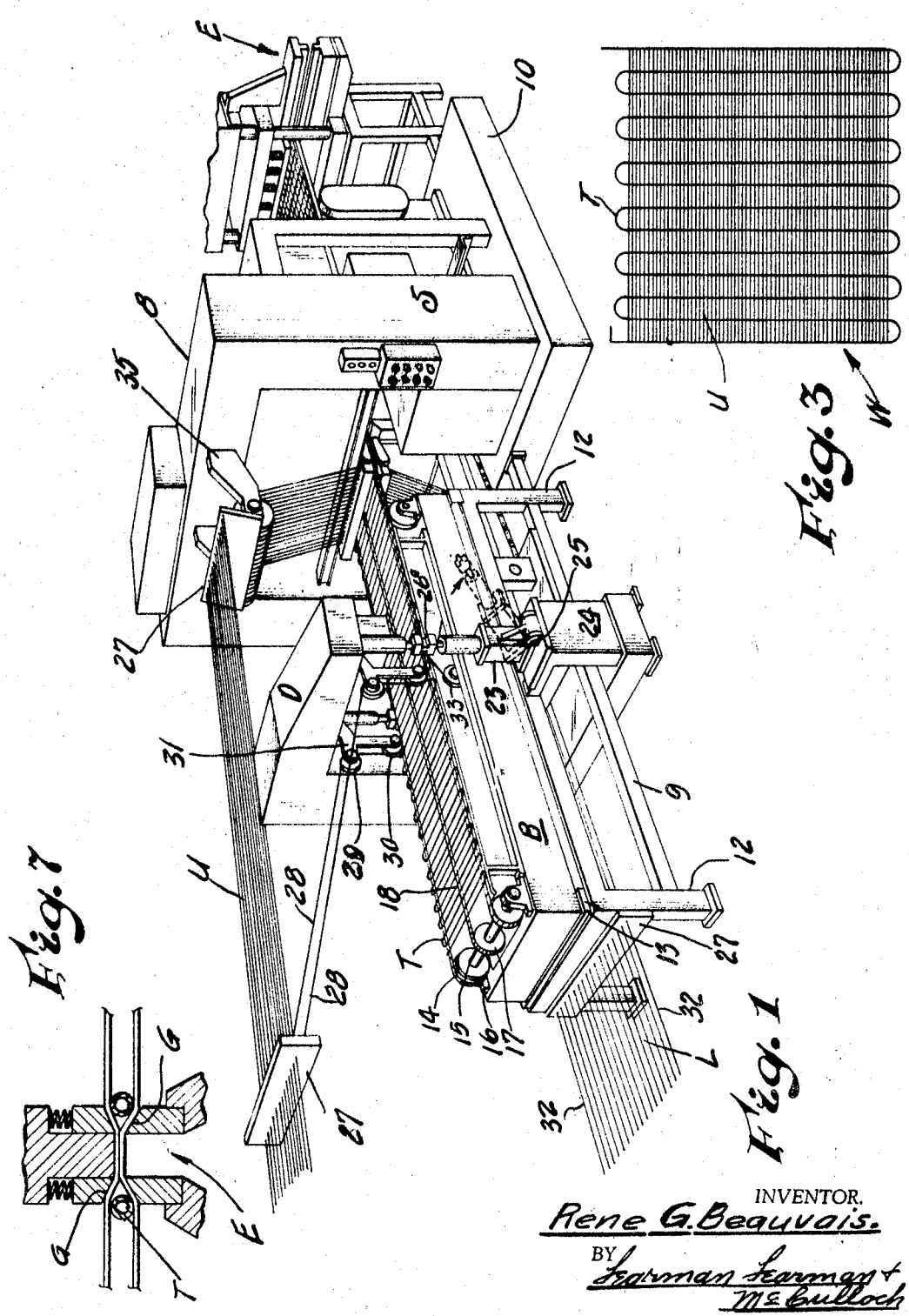

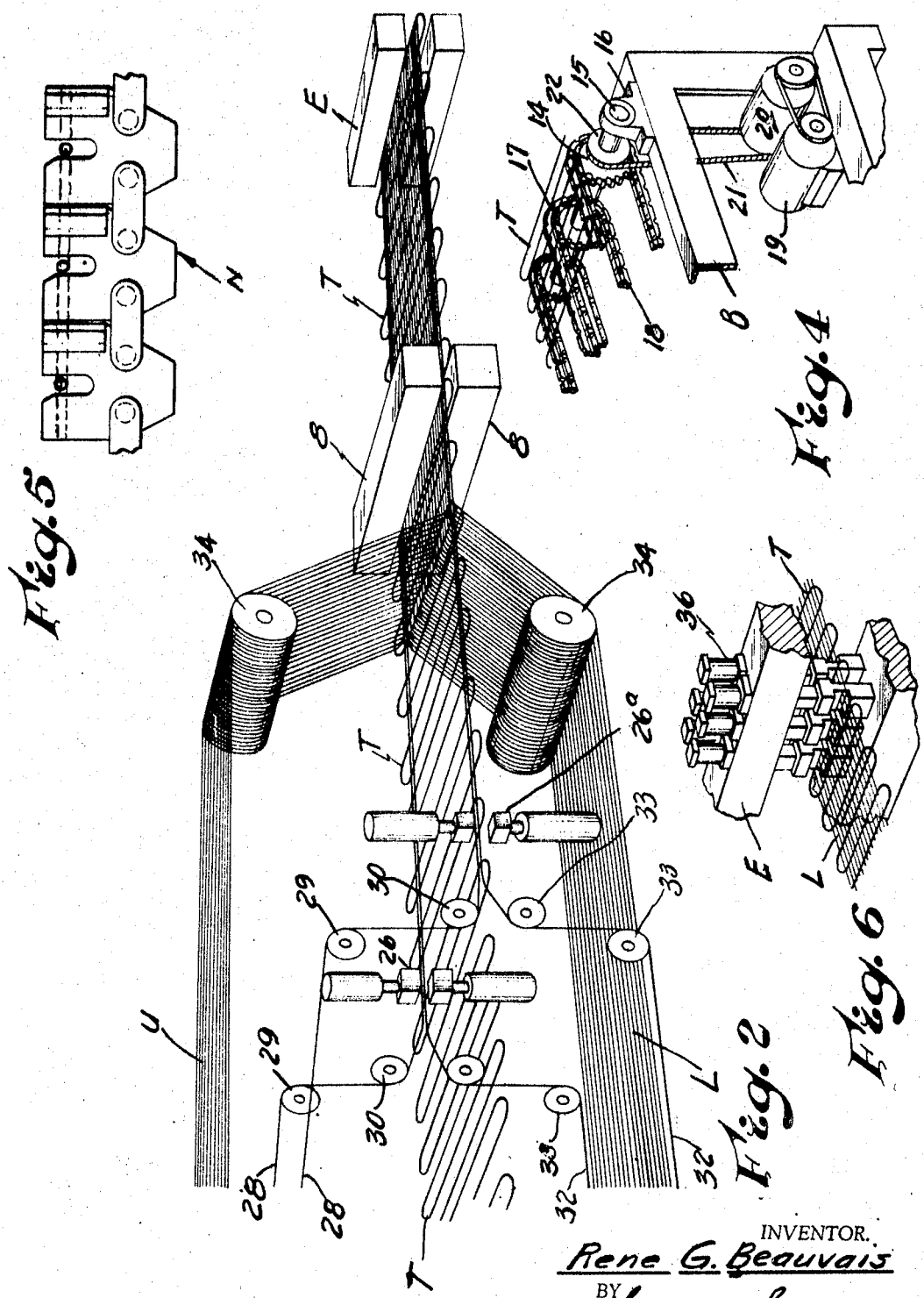

3,460,225
METHOD OF FORMING A WIRE CONDENSER MAT WELDER
Rene G. Beauvais, Bay City, Mich., assignor to Resistance Welder Corporation, Bay City, Mich., a corporation of Michigan
Filed Sept. 26, 1966, Ser. No. 582,042
Int. Cl. B21d 53/00; B23p 15/26
U.S. Cl. 29—157.3                    7 Claims

ABSTRACT OF THE DISCLOSURE

A method of forming condenser mats by first welding at least one rigidifying wire across the loops of the condenser mats to insure proper spacing of the loops and then welding a wire field to the loops to complete the condenser mats.

---

This invention relates to wire condenser mat welders, and more specifically to a mat welder having quick change-over features, allowing the manufacture of a plurality of tube pitch spacings, previously too expensive and time consuming on machines presently in use due to the large number of changeover operations necessary to accommodate each pitch pattern.

Wire condensers of the type herein referred to consist of a serpentine formed tube formed with multiple passes of from four to thirty folds per mat, said mats running in a continuous, uninterrupted pattern through the machine. A series of spaced apart fields of longitudinal wires cross the longitudinal passes of the tubes and are welded to the opposite sides of the tubes, with the number of wires running from approximately 30 to 150 wires on each side of the tube pattern. After the welding and indexing operations of the machine, a wire cut-off unit shears the longitudinal wires at the ends of the interrupted tube passes, making a plurality of individual mats from the continuous line.

It should be understood that this matter of assembling mats by using continuous wire feed and serpentine passes through a mechanical press welder and shear has heretofore been used in the industry. However, these machines of previous design had a serious disadvantage, which was the limitation of running one tube pitch pattern only through the machine. Each time it was necessary to run another tube pitch pattern, an expensive time consuming change-over was necessary.

In brief, the prime object of the invention is to provide a change-over process utilizing an interchangeable cartridge type chain feeder for the serpentine tubes which accomplishes the spacing and indexing of the tube through a spot welder which guides and welds the two extreme side wires of the wire field to the top and bottom sides of the serpentine tube, thus anchoring the wires to the tubes with the wires acting as spacers for the subsequent feeding of the parts through the weld press and to the cut-off shear.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:
FIG. 1 is an isometric, side elevational view of my wire condenser mat welder, the broken lines showing one leg of the welder frame swung down;
FIG. 2 is a diagrammatic representation of the welding and feeding sequence;
FIG. 3 is a plan view of one of the mats;
FIG. 4 is a fragmentary, isometric view of the conveyor drive;
FIG. 5 is a fragmentary, perspective view of a section of the conveyor chain;
FIG. 6 is a fragmentary, perspective view of the press welder; and
FIG. 7 is a transverse sectional view showing the shearing mechanism.

Referring now more specifically to the drawings in which I have shown the preferred embodiment of my invention. The numeral 8 indicates a main mechanical press welder which is of conventional design, and a frame section 9 is secured to the base 10 of the press welder by welding or by means of bolts or the like, and legs 12 are provided on said frame as usual. An interchangeable cartridge type chain feeder table B is mounted on the frame 9, and transversely disposed pad members 13 span the ends of the frame and form a support for the chain feeder unit.

Sprockets 14 are mounted on shafts 15 journalled in bearings 16 provided on the ends of the table B, and other sprockets 17 are interposed between the side sprockets 14 to accommodate other tubes which are shorter in length.

A drive chain 18 drivingly connects the sprockets 17 and the driving means comprises a motor 19, clutch and drive system 20, and a drive chain 21 connects the motor with a drive sprocket 22 on the conveyor shaft 15.

A small frame type spot welder D spans the chain feeder table B, and one leg section 23 of said frame is hingedly mounted on a leg support 24 by means of a hinge bolt 25, and for a purpose to be presently described.

A wire condenser mat unit W is clearly shown in FIG. 3 of the drawings and consists of a serpentine formed tube T with multiple passes of from 4 to 30 folds per mat; the mats being fed on the machine by an operator, and these mats travel in a continuous uninterrupted pattern through the machine.

A pair of pre-weld stations 26—26 are provided on the welder frame D and are arranged for welding the two extreme side wires of both the upper and lower fields U and L as they travel over the feeder table B, and the upper and lower fields of longitudinal wires and U and L cross the longitudinal tubes T and are welded to the opposite sides thereof, the number of wires running from approximately 30 to 150 wires on each side of the tube, and these tubes are in fact supported by the weld of the single wires to the tube T so that when welded they accurately bridge the space between the end of the feeder table and the main press welder 8 as they travel to the press welding station and thence to the cut-off shears E which include blades G which do the cutting, and I shall not describe this weld station and the cut-off shears in detail as they are the same as used on previously manufactured machines and form no part of the present invention.

The features of the instant invention are schematically shown in FIGS. 1 and 2 of the drawings, the upper wire field U leading from a balcony (not shown), or from a customer's existing wire field through perforated stationary bushing guide members 27, at which point the two opposite outer edge wires 28—28 of the upper wire field lead over grooved rollers 29 and 30, which are journalled on a triangularly shaped bracket 31 which is adjustably mounted on the welder frame D, thence leading to one of the pre-weld stations 26 for welding the wires to the opposite sides of the tubes. The outer edge wires 32—32 of the lower field L are substantially the same as the upper field, these wires also lead through bushing guide members 27, mounted on the end of the table B, thence inwardly below the table B, thence upwardly over the grooved rollers 33—33, which are mounted on the frame 12, thence leading to one pre-weld station 26 which welds these wires to the tubes. This welding of the edge wires anchors the tubes, and the wires serve as spacers. The pre-weld stations 26—26 are exactly the same, and as these edge wires are welded to the tubes T they travel over the end of the table and feed into the main press welder S. Simultaneously therewith, the remaining wires of each field feed through the bushing guides 27, thence over the grooved rollers 34—34, which are mounted on brackets 35 provided on the frame. Thence these wires are conveyed over the feeder table B and into the main press welder S, see FIG. 6 of the drawings, which shows the weld heads E of the press welder in contact with the incoming wire, and the serpentine tubes T. After the condensers travel through the press welder, a wire cut-off unit E (see FIG. 7 of the drawings) shears the individual wires at the end of the interrupted tube passes, making individual mats W from the continuous line.

In prior machines of this general classification the biggest drawback is the change-over process and the limitation of running only one-two pitch pattern through the machine. This pitch pattern is the distance between multiple passes formed by the serpentine formed tubes, and when it becomes necessary to change to another pitch pattern, another very extensive time-consuming change-over of the feeder table, etc., is necessary, and I have, therefore, designed the cartridge type chain feeder table B equipped with chains N which accommodate the serpentine tube T and accomplishes the spacing and indexing of the tube pitches through the small frame type spot welders 26, which welds the single side wires of each field to the opposite sides of the sergentine tube, and it will be obvious that this pre-welding of the side wires to the tube insures accurate horizontal travel and rigidity of the wire as it travels to the welder, and this anchors the tubes, with the wires serving as spacers for subsequent feeding of the wire into the main press welder. The remaining wires are then fed directly to the feeder table and into the press welder, and the chain feeder system terminates at a point spaced from the press welder station. This welding of the side wires to the tubes eliminates the need for an index feeder chain (not shown) to pass through the press weld station.

In accomplishing this change-over, the operator first swings down the outboard lower spot welding gun 26a on the frame spot welder, after which he removes the cartridge feeder table B and replaces it with another tooled for a different pitch spacing, and this is done either by means of an inbuilt hoist (not shown), which forms a part of the machine, or by means of a hoist located at a point directly adjacent the machine. The outboard gun 26a is then swung back to adjusted position, and the extreme side wires are fed back through the weld unit ready for welding through the first tube pass that enters the machine.

This change-over consumes only a very limited down time and expense, and the machine is readily set to produce a certain tube pitch pattern. The mat shown is the continuous pattern which travels through the press welder, thence travels to the shear station from which the mats (shown in FIG. 3) are then cut to predetermined length and ejected.

While preferred embodiments in accordance with the present invention have been illustrated and described, it should be understood that various modifications may be resorted to without departing from the spirit and scope of the appended claims.

I claim:
1. A method of forming mats which comprises: a series of crosswisely extending connected loops disposed in front to rear relation to form a mat length which includes the steps of
   (a) welding at least one lengthwise extending wire adjacent each edge of said mat length across said loops to connect said loops and rigidify the mat structure;
   (b) then passing a wire field comprising a series of longitudinally extending wires into engagement with the loops crosswise thereto and between said edge wires;
   (c) and welding the wire field to connect said loops.

2. A method of forming mats which comprises: a series of crosswisely extending connected loops disposed in front to rear relation to form a mat length which includes the steps of
   (a) welding at least one lengthwise extending wire across both sides of said loops to connect said loops and rigidify the mat structure;
   (b) then passing a wire field into engagement with the loops crosswise thereto, and welding the wire field to connect said loops.

3. A method of forming mats which comprises: a series of crosswisely extending connected loops disposed in front to rear relation to form a mat length which includes the steps of
   (a) welding at least one lengthwise extending wire across said loops to connect said loops and rigidify the mat structure;
   (b) then passing a wire field into engagement with both sides of the loops crosswise thereto, and welding the wire field to connect said loops.

4. A method of forming mats which comprises: a series of crosswisely extending connected loops disposed in front to rear relation to form a mat length which includes the steps of
   (a) welding at least one lengthwise wire adjacent one edge of the mat length so as to contact said loops on only one side of said mat structure;
   (b) then passing a wire field comprising a series of longitudinally extending wires into engagement with the loops crosswise thereto and between said edges wires.

5. The combination defined in claim 1 in which edge wires are first welded on both sides of the mat lengths along both edges thereof; and wire fields are then welded on both sides of said mat lengths.

6. A method as set forth in claim 5 in which said mat lengths are then cut into sections.

7. A method of forming condenser mats which comprises: a series of crosswisely extending connected tube loops disposed in front to rear relation to form a mat length which includes the steps of
   (a) presenting a mat length to a welding station;
   (b) simultaneously running a plurality of lengthwisely extending parallel wires a spaced distance above said mat length, forward and beyond said welding station; and a similar plurality of lengthwisely extending parallel wires disposed a spaced distance below said mat lengths, forword and beyond said welding station;

(c) peeling off the edge wire at each side of the plurality of upper wires, and each side of the lower wires and bringing them into juxtaposed position with the mat lengths downstream of the welding station;

(d) moving the mat lengths through the welding station with said edge wires, and spot welding the edge wires to the loops as they pass through the welding station;

(e) moving the remaining upper wires and the remaining lower wires into juxtaposed position with the mat lengths downstream of said welding station and upstream of a second welding station;

(f) and welding the said remaining wires to the loops as they are passed through said second welding station.

References Cited

UNITED STATES PATENTS

| 2,390,174 | 12/1945 | Roemer | 140—112 X |
| 2,747,064 | 5/1956 | Pappelendam. | |
| 3,063,476 | 11/1962 | Roesler | 140—112 |
| 3,159,213 | 12/1964 | Wurtz. | |
| 3,288,976 | 11/1966 | Sandret | 219—80 X |
| 3,369,575 | 2/1968 | Rosler | 140—112 |

JOHN F. CAMPBELL, Primary Examiner

J. L. CLINE, Assistant Examiner

U.S. Cl. X.R.

29—471; 140—112; 219—80, 117